United States Patent
Hooli et al.

(10) Patent No.: US 9,480,027 B2
(45) Date of Patent: Oct. 25, 2016

(54) UPLINK POWER CONTROL FOR WIRELESS COMMUNICATIONS

(71) Applicant: Nokia Solutions and Networks Oy, Espoo (FI)

(72) Inventors: Kari Juhani Hooli, Oulu (FI); Jari Olavi Lindholm, Palojoki (FI); Kari Pekka Pajukoski, Oulu (FI); Esa Tapani Tiirola, Kempele (FI); Timo Erkki Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/356,682

(22) PCT Filed: Oct. 30, 2012

(86) PCT No.: PCT/EP2012/071467
§ 371 (c)(1),
(2) Date: May 7, 2014

(87) PCT Pub. No.: WO2013/068276
PCT Pub. Date: May 16, 2013

(65) Prior Publication Data
US 2014/0328298 A1 Nov. 6, 2014

Related U.S. Application Data

(60) Provisional application No. 61/556,444, filed on Nov. 7, 2011.

(51) Int. Cl.
*H04W 4/00* (2009.01)
*H04W 52/24* (2009.01)

(52) U.S. Cl.
CPC ......... *H04W 52/242* (2013.01); *H04W 52/244* (2013.01); *H04W 52/246* (2013.01)

(58) Field of Classification Search
CPC ........... H04W 52/242; H04W 52/244; H04W 52/245; H04W 52/246
USPC .......................................... 370/329
See application file for complete search history.

(56) References Cited

U.S. PATENT DOCUMENTS

| 6,097,637 | A | * | 8/2000 | Bauer | G11C 11/5621 365/168 |
| 6,701,130 | B1 | * | 3/2004 | Hamalainen | H04W 36/0083 370/331 |
| 2009/0286566 | A1 | * | 11/2009 | Lindholm | H04W 52/10 455/522 |

(Continued)

FOREIGN PATENT DOCUMENTS

| WO | WO2012146307 A1 | 11/2012 |
| WO | WO2012149661 A1 | 11/2012 |

OTHER PUBLICATIONS

TSG-RAN WG1 #63bis; "CoMP simulation assumptions"; Dublin, Ireland; Jan. 17-21, 2011; R1-110598; 4 pgs.

(Continued)

*Primary Examiner* — Sai-Ming Chan
(74) *Attorney, Agent, or Firm* — Harrington & Smith

(57) ABSTRACT

The specification and drawings present a new method, apparatus and software related product (e.g., a computer readable memory) for implementing power control for uplink orthogonal and non-orthogonal resources for an uplink channel, e.g. for PUCCH or PUCSH, when CoMP is utilized in a wireless network (e.g., LTE).

18 Claims, 5 Drawing Sheets

(56) References Cited

U.S. PATENT DOCUMENTS

2012/0140778 A1* 6/2012 Wang .................. H04W 72/005
                                                    370/475
2013/0215835 A1* 8/2013 Chen ................. H04W 72/0406
                                                    370/329

OTHER PUBLICATIONS

3GPP TSG RAN WG1 Meeting #66; "On the PUCCH Modifications for CoMP"; Athens, Greece; Aug. 22-26, 2011; R1-112387; 3 pgs.

3GPP TS 35.213 V10.3.0 (Sep. 2011); "3rd Generation Partnership Project; Technical Specification Group Radio Access Network; Evolved Universal Terrestrial Radio Access (E-UTRA); Physical layer procedures (Release 10)"; 122 pgs.

3GPP TSG RAN WG1 Meeting #66bis; "On UL CoMP Standardization Impact"; Zhuhai, China; Oct. 10-14, 2011; R1-113148; 2 pgs.

3GPP TSG-RAN WG1 #65; "Uplink Power Control Discussion for CoMP Scenario 4"; Barcelona, Spain; May 9-13, 2011; R1-111598; 16 pgs.

* cited by examiner

UPLINK POWER CONTROL FOR WIRELESS COMMUNICATIONS

TECHNICAL FIELD

The exemplary and non-limiting embodiments of this invention relate generally to wireless communications and more specifically to implementing power control for uplink orthogonal and non-orthogonal resources, e.g. for PUCCH or PUSCH, when CoMP is utilized.

BACKGROUND ART

The following abbreviations that may be found in the specification and/or the drawing figures are defined as follows:

3GPP Third Generation Partnership Project
A/N: ACK/NACK Acknowledgement/Negative Acknowledgement
CoMP Coordinated Multi-Point
CQI Channel Quality Indicator
CRS Common (Cell-specific) Reference Signals
CSI Channel State Information
CSI-RS Channel State Information Reference Signals
DL Downlink
DM RS Demodulation Reference Signal
E-UTRA Evolved Universal Terrestrial Radio Access
eNB Evolved Node B/Base Station in an E-UTRAN System
E-UTRAN Evolved UTRAN (LTE)
FDD Frequency Division Duplex
FDM Frequency Division Multiplexing
ID (id) Identity/Identification
LTE Long Term Evolution
LTE-A Long Term Evolution Advanced
MAC Medium Access Control
PC Power Control
PCell Primary Cell
PHY Physical Layer
PL Path Loss
PRB Physical Resource Block
PDCCH Physical Downlink Control Channel
PUCCH Physical Uplink Control Channel
PUSCH Physical Uplink Shared Channel
RRC Radio Resource Control
RAN Radio Access Network
RRH Remote Radio Head
Rx Reception
SC-FDMA Single-Carrier Frequency Division Multiple Access
SCell Secondary Sell
SINR Signal-to-Interference-Plus-Noise Ratio
TDD Time Division Duplex
TDM Time Division Multiplexing
TPC Transmitter Power Control
Tx Transmit
UCI Uplink Control Information
UE User Equipment (e.g. mobile terminal)
UL Uplink
UL-SCH Uplink Shared Channel
UTRAN Universal Terrestrial Radio Access Network Coordinated Multi-Point (CoMP) transmission and reception is one of the technologies investigated in 3GPP. During the study, an uplink power control was recognized as one of the topics where enhancements need to be considered.

In Release 10 of 3GPP, PUCCH PC is defined by the formula (see 3GPP TS 36.213 V10.3.0 (2011-09), Section 5.1.2.1) as follows:

$$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{T \times D}(F') + g(i) \end{array} \right\}, \quad (1)$$

where Po_PUCCH parameter defines the signal power level at the reception. PL_c is the pathloss (open loop component) based on CRS measurement in the downlink, and g(i) is the accumulated value of closed loop power control commands. The rest of the parameters are used to scale power so that different number of control bits, different number of antennas and different PUCCH formats are taken into account.

Also a similar expression is provided for the PUSCH PC (see 3GPP TS 36.213 V10.3.0 (2011-09), Section 5.1.1.1) as follows:

$$P_{PUSCH,c}(i) = \min\left\{ \begin{array}{l} P_{CMAX,c}(i), \\ 10\log_{10}(M_{PUSCH_c}(i) + P_{O\_PUSCH,c}(j) + \alpha_c(j) \cdot PL_c + \Delta_{TF,c}(i) + f_c(i) \end{array} \right\}. \quad (2)$$

There are several issues that need to be taken into account when defining PUCCH (or PUSCH) PC operation for the CoMP case.

SUMMARY

According to a first aspect of the invention, a method, comprises: measuring by a user equipment a pathloss for an uplink resource out of orthogonal uplink resources and non-orthogonal uplink resources to a single reception point or to multiple reception points in a wireless network; and determining by the user equipment an effective pathloss to define a transmit power to wirelessly transmit specific information to the single reception point or to the multiple reception points on the uplink resource, the measuring and determining are performed using: a first criterion where, if the uplink resource is an orthogonal uplink resource to be sent to the multiple reception points, an effective pathloss to the multiple reception points is determined according to a predefined rule, and a second criterion where, if the uplink resource is a non-orthogonal uplink resource to be sent to the single reception point, an effective pathloss to the single reception point is determined as being proportional to the pathloss measured to the single reception point using an identification of the non-orthogonal uplink resource.

According further to the first aspect of the invention, the multiple reception points may be associated with a preconfigured coordinated multi-point setup and the single reception point is associated with a cell specific or reception point specific setup.

According still further to the first aspect of the invention, the specific information may be intended to be sent on the orthogonal uplink resource to the multiple reception points, and the predefined rule may be used for the determining the effective pathloss which defines the transmit power for the uplink resource.

Still further according to the first aspect of the invention, the specific information may be intended to be sent on the non-orthogonal uplink resource and the effective pathloss may define the transmit power for the uplink resource.

According further to the first aspect of the invention, the specific information may be a complex information intended for both an orthogonal resource and a non-orthogonal resource, and the uplink resource may be chosen by default rules, so that if the chosen resource is orthogonal, the effective pathloss is determined according to the first criterion, and if the chosen resource is non-orthogonal, the effective pathloss is determined according to the second criterion.

According still further to the first aspect of the invention, before the measuring the method comprises: receiving by the user equipment from a wireless network a configuration of the orthogonal and non-orthogonal uplink resources with the identification of each resource of the orthogonal and non-orthogonal uplink resources. Further, the identification may be identical for the each resource, identical for selected resources or different for all or selected resources of the orthogonal and non-orthogonal uplink resources.

According yet further still to the first aspect of the invention, choosing the uplink resource to be used for the wireless transmission by the user equipment of the specific information may be performed by the wireless network or by the user equipment, or by both the wireless network and the user equipment.

Yet still further according to the first aspect of the invention, according to the predefined rule the effective pathloss for the uplink resource may be determined as a minimum value out of values of the pathloss measured to the multiple reception points or as an inverse of a sum of inverse values of the pathloss measured to each of the multiple reception points.

Still yet further according to the first aspect of the invention, the user equipment may receive from the wireless network a set of downlink resources which are used by the user equipment to measure the pathloss to the single reception point or to the multiple reception points. Yet further, the downlink resources may be downlink channel state information reference signals.

Still further still according to the first aspect of the invention, the measuring by the user equipment the pathloss to the single reception point or to the multiple reception points may be provided using open loop measurements based on downlink resources provided by the wireless network for the user equipment.

According further still to the first aspect of the invention, the uplink resource may be a physical uplink control channel resource.

According yet further still to the first aspect of the invention, the uplink resource may be a physical uplink shared channel resource. Still further, the method comprises: receiving by the user equipment from a wireless network a beta parameter indicating whether to use a single-cell reception or a multi-cell reception for data or uplink control information to be transmitted on the physical uplink shared channel. Yet still further, both the data and the uplink control information may be transmitted to be received based on the single-cell reception or the multi-cell reception. Further still, the data may be transmitted to be received based on the multi-cell reception and the uplink control information may be transmitted to be received based on the single-cell reception.

According still yet further to the first aspect of the invention, according to the second criterion, the effective pathloss to the single reception point may be equal to the measured pathloss to the single reception point.

According further to the first aspect of the invention, the transmit power may be further dependent on a parameter defining single power level which is reception-point specific or uplink-resource specific.

Still further according to the first aspect of the invention, the transmit power may further depend on closed loop commands or accumulated value of closed loop commands which is uplink-resource specific or uplink-resource-type specific.

According yet further to the first aspect of the invention, the single reception point may be selected using the effective pathloss determined based on the identification of the non-orthogonal uplink resource.

According to a second aspect of the invention, an apparatus comprises: at least one processor and a memory storing a set of computer instructions, in which the processor and the memory storing the computer instructions are configured to cause the apparatus to: measure a pathloss for an uplink resource out of orthogonal uplink resources and non-orthogonal uplink resources to a single reception point or to multiple reception points in a wireless network; and determine an effective pathloss to define a transmit power to wirelessly transmit specific information to the single reception point or to the multiple reception points on the uplink resource, the measuring and determining are performed using: a first criterion where, if the uplink resource is an orthogonal uplink resource to be sent to the multiple reception points, an effective pathloss to the multiple reception points is determined according to a predefined rule, and a second criterion where, if the uplink resource is a non-orthogonal uplink resource to be sent to the single reception point, an effective pathloss to the single reception point is determined as being proportional to the pathloss measured to the single reception point using an identification of the non-orthogonal uplink resource.

According further to the second aspect of the invention, the specific information may be intended to be sent on the orthogonal uplink resource to the multiple reception points, and the predefined rule may be used for the determining the effective pathloss which defines the transmit power for the uplink resource.

Still further according to the second aspect of the invention, the specific information may be intended to be sent on the non-orthogonal uplink resource and the effective pathloss may define the transmit power for the uplink resource.

According further to the second aspect of the invention, the specific information may be a complex information intended for both an orthogonal resource and a non-orthogonal resource, and the uplink resource may be chosen by default rules, so that if the chosen resource is orthogonal, the effective pathloss is determined according to the first criterion, and if the chosen resource is non-orthogonal, the effective pathloss is determined according to the second criterion.

According to a third aspect of the invention, a non-transitory computer readable memory encoded with a computer program comprising computer readable instructions recorded thereon for execution, the computer program comprises: a code for measuring by a user equipment a pathloss for an uplink resource out of orthogonal uplink resources and non-orthogonal uplink resources to a single reception point or to multiple reception points in a wireless network; and code for determining by the user equipment an effective pathloss to define a transmit power to wirelessly transmit specific information to the single reception point or to the multiple reception points on the uplink resource, the measuring and determining are performed using: a first criterion where, if the uplink resource is an orthogonal uplink resource to be sent to the multiple reception points, an effective pathloss to the multiple reception points is determined according to a predefined rule, and a second criterion where, if the uplink resource is a non-orthogonal uplink resource to be sent to the single reception point, an effective pathloss to the single reception point is determined as being proportional to the pathloss measured to the single reception point using an identification of the non-orthogonal uplink resource.

According to a fourth aspect of the invention, a method comprises: receiving by a user equipment from a wireless network a beta parameter indicating whether to use a single-cell reception or a multi-cell reception for data or uplink control information to be transmitted on an uplink shared channel; and transmitting by the user equipment the data and the uplink control information to be received based on the beta parameter.

Further according to the fourth aspect of the invention, both the data and the uplink control information may be transmitted to be received based on the single-cell reception or the multi-cell reception.

Still further according to the fourth aspect of the invention, the data may be transmitted to be received based on the multi-cell reception and the uplink control information may be transmitted to be received based on the single-cell reception.

According further to the fourth aspect of the invention, both the data and the uplink control information may be transmitted using non-orthogonal resources.

BRIEF DESCRIPTION OF THE DRAWINGS

For a better understanding of the nature and objects of the present invention, reference is made to the following detailed description taken in conjunction with the following drawings, in which.

DETAILED DESCRIPTION

Figure 1A:
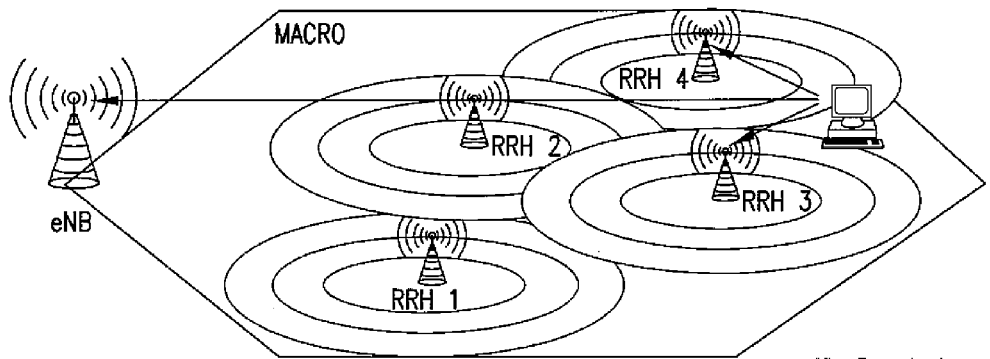
FIGS. 1a and 1b are schematic representations of Scenarios 3 and 4 for CoMP configurations in heterogeneous networks.

A new method, apparatus, and software related product (e.g., a computer readable memory) are presented for implementing power control for uplink orthogonal and non-orthogonal resources for an uplink channel, e.g. for PUCCH or PUCSH, when CoMP is utilized in a wireless network (e.g., LTE).

The general problem with UL PC in case of the CoMP is that the open loop component in UL PC formula needs to be defined differently from the definition provided in Releases 8/9/10 of 3GPP because DL transmission point(s) and UL reception point(s) are not necessarily the same but the open loop component in Releases 8/9/10 of 3GPP is based on the DL measurement.

In case of the PUCCH, multiple UEs can transmit their signal in the same frequency resource at the same time, and detection of the signals is based on different orthogonal sequences used by different UEs. In order to provide a reliable detection of the PUCCH, signal levels of different UEs at the reception point need to be at the same level.

There may be situations when the UE is moving and is not transmitting on the PUCCH for a period of time (e.g., scheduling request or Ack/Nack on the PUCCH), so the open loop component in the PUCCH PC should be accurate enough.

In order to support a large number of UEs in the CoMP area (which may be larger than a typical macro cell and/or contain many Tx/Rx points) and keep a number of PRBs reserved for the PUCCH at a reasonable level, it is desirable to be able to use cell splitting gain within the PUCCH, i.e., to reuse the same resources within the CoMP area if the transmissions do not interfere with each other.

To achieve cell splitting gain and reduce PUCCH overhead while achieving CoMP gains on the PUCCH for the UEs (for the configured payload), it has been proposed that two types of PUCCH resources may be used in the CoMP area (see: R1-112387, "On the PUCCH Modifications for CoMP", 3GPP TSG RAN WG1 Meeting #66, Athens, Greece, 22-26 Aug. 2011):

inter Rx point orthogonal resources that are unique in the CoMP area and can be received in multiple reception points, and inter Rx point non-orthogonal resources that are meant to be received only in one point (e.g., being cell specific) are non-orthogonal for the UEs signals received via different points. (On other hand, UEs signals received via the same point should have mutually orthogonal resources.) Thus, the same resource may be allocated to multiple UEs in the CoMP area so that cell splitting gain may be achieved.

Both types of resources can be allocated to the same UE. However, it is unclear how the UE will define its transmission power.

It has been proposed that pathloss measurement in the UL PC formula (see Equation 1 and 2) would be based on Tx point specific CSI-RS and then pathloss measurement to different points in CoMP area would be possible (see: R1-111598, "Uplink Power Control Discussion for CoMP Scenario 4", 3GPP TSG RAN WG1 Meeting #65, Barcelona, Spain, 9-13 May 2011). In 3GPP terminology this could be referred to as per-CSI-RS-resource pathloss measurement.

It has also been proposed that the DM RS sequences that are used in UL would not depend on DL cell-id but there would be a separate "UL cell-id" so that cross cell scheduling would be possible (i.e., an eNB may decide which reception point is the target point for the UL transmissions) as disclosed in PCT Application Number PCT/CN2011/000766 filed on Apr. 30, 2011.

PCT Application Number PCT/CN2011/000766 filed on Apr. 30, 2011 and another PCT Application Number PCT/EP2011/056867 filed on Apr. 29, 2011 have considered a PUCCH arrangement for the CoMP. However, neither has considered a PUCCH TPC arrangement when both orthogonal and non-orthogonal PUCCH resources are configured to the UE.

The following scenarios for CoMP configuration were identified (e.g. see R1-110598, "CMP Simulation Assumptions", 3GPP TSG RAN WG1 Meeting #63bis, Dublin, Ireland, 17-21 Jan. 2011):

Scenario 1: Homogeneous network with intra-site CoMP;

Scenario 2: Homogeneous network with high Tx power RRHs;

Scenario 3: Heterogeneous network with low power RRHs within the macrocell coverage where the transmission/reception points created by the RRHs have different cell IDs from the macro cell; and Scenario 4: Network with low power RRHs within the macrocell coverage where the transmission/reception points created by the RRHs have the same cell ID as the macro cell.

The embodiments of the invention may be practiced in CoMP configurations for all four scenarios, but especially for Scenarios 3 and 4. FIG. 1a shows an example related to Scenarios 3 and 4 for CoMP configurations in heterogeneous networks (as discussed in R1-112387, "On the PUCCH Modifications for CoMP" 3GPP TSG RAN WG1 Meeting #66, Athens, Greece, 22-26 Aug. 2011), where in a macro cell the UE may communicate with eNB and RRHs as shown.

Figure 1B:
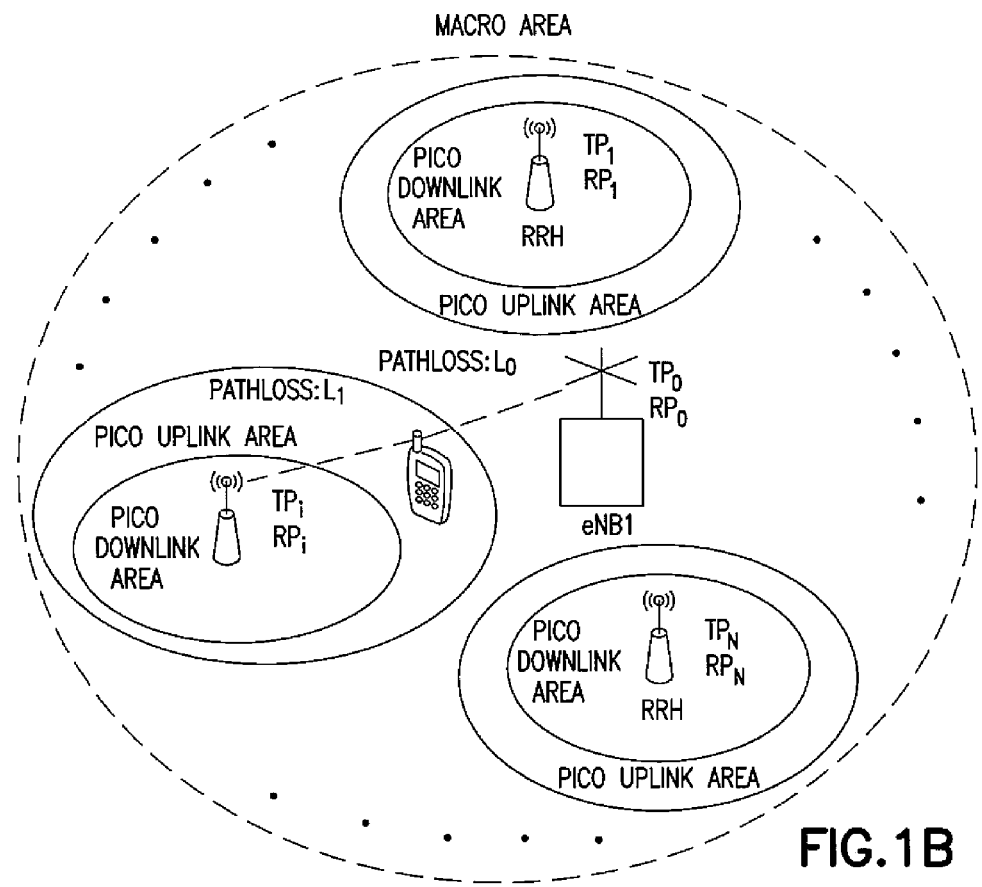

FIG. 1b shows a more detailed representation of Scenario 4 (as discussed in R1-111598 "Uplink Power Control Discussion for CoMP Scenario 4", 3GPP TSG RAN WG1 Meeting #65, Barcelona, Spain, 9-13 May 2011). The macro UE (eNB) is indexed with "0" as a TP (Transmission Point) in the downlink and RP (Reception Point) in the uplink. The total number of low power RRHs (located in corresponding pico areas) within the macro cell area with the same cell ID as the eNB is N, and they are indexed with $(TP_i, RP_i)$ for downlink and uplink transmission, respectively. Pathloss $(L_0, L_i)$ from eNB/RRH to the UE with approximate channel reciprocity is assumed, i.e., the path loss is the same for both downlink and uplink transmission.

Furthermore, an uplink channel (e.g., PUCCH or PUSCH) for a UE in a wireless network may be configured (by the network) to have an ID that defines DM RS sequences and randomization methods. Moreover, the UE may be further configured by the network (e.g., via higher layer RRC signaling) with a set of downlink resource (e.g., DL CSI-RS resource and possibly CRS resource) that the UE may use to measure pathloss values, as further described herein.

The two types of the uplink channel (e.g., PUCCH or PUSCH) resources which may be used in the CoMP area (for example, corresponding to one of the 4 scenarios described above) may be as follows: a) inter Rx point orthogonal uplink channel (e.g., PUCCH or PUSCH) resources that are unique in the CoMP area and may be received in multiple reception points, and b) inter Rx point non-orthogonal uplink channel (e.g., PUCCH or PUSCH) resources that are meant to be received only in one (single) point; thus the same non-orthogonal uplink channel resource may be allocated to multiple UEs in the CoMP area so that cell splitting gain may be achieved. In the case of PUSCH, a DM RS resource may be a resource of type a) or b). PUSCH resources (e.g., SC-FDMA symbols available for user data and/or UCI transmission) are frequently inter-Rx point non-orthogonal channel resources that may be received in only one (single) reception point or in multiple reception points.

Figure 2:
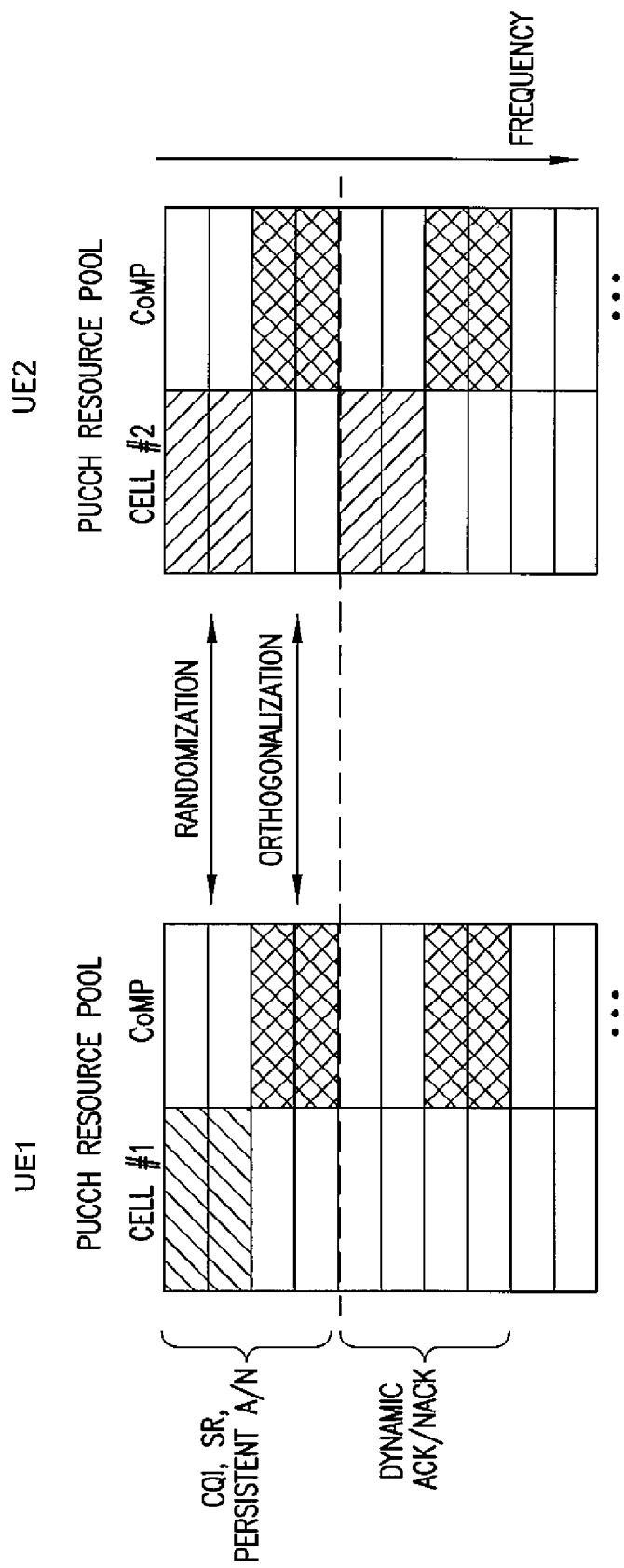
FIG. 2 is a schematic diagram demonstrating allocation in frequency domain of PUCCH resources in the UE1 and UE2 for two types of CoMP resources: orthogonal (CoMP specific) and non-orthogonal (cell specific) for practicing exemplary embodiments of the invention.

FIG. 2 illustrates allocation in frequency domain of PUCCH resources in the UE1 (cell 1) and UE2 (cell 2) for two types of CoMP resources: orthogonal (CoMP specific) and non-orthogonal (e.g., using a cell specific or reception point specific setup) as described in R1-112387, "On the PUCCH Modifications for CoMP" 3GPP TSG RAN WG1 Meeting #66, Athens, Greece, 22-26 Aug. 2011.

Moreover, when dividing PUCCH resources to orthogonal and non-orthogonal, the following considerations, for example, may be taken into account: a) Dynamic Ack/Nack should be in the orthogonal resource especially if there is only one PDCCH in the CoMP set (such that no modifications are required to PUCCH resource mapping); hence, the related pathloss may be derived from the set of pathloss measurements as described herein; and b) Periodically transmitted PUCCH may be mapped to the non-orthogonal resource; hence, the related pathloss may be derived from a PUCCH identity.

The following examples illustrate various embodiments of the invention for a transmission power control in the uplink channel (e.g., PUCCH or PUSCH) for orthogonal and non-orthogonal uplink resources.

The pathloss value is an important parameter (see Equations 1 and 2 above) which determines the transmission power for the uplink channels of interest. Therefore, for determining the uplink power setting, first, the UE may measure pathloss to a single reception point (for the non-orthogonal uplink resource, e.g., for a cell specific setup) or pathlosses to multiple reception points (for the orthogonal uplink resource) based on the configured CoMP set (applicable for both PUCCH and PUSCH) using an open loop measurement based on the DL resource information (e.g., CSI-RS-resource or a set of CSI-RS-resources corresponding to CoMP set for pathloss measurement or the like). It is noted that closed loop measurements or partial closed loop measurements are also possible.

The decision to use orthogonal or non-orthogonal uplink resource for sending specific information may be a default decision (e.g., Dynamic Ack/Nack should be in orthogonal uplink resource or CQI should be in the non-orthogonal resource, etc.), or may be configured by the wireless network or by the UE itself.

Moreover, information about which single reception point (for the non-orthogonal uplink resources) or multiple reception points (for the orthogonal uplink resources) to send information to may be a default information, may be provided by the wireless network to the UE, or may be decided by the UE itself.

Then according to an embodiment of the invention, the effective pathloss value may be determined using a first criterion for the orthogonal uplink resource (to be sent to multiple reception points) and using a second criterion for the non-orthogonal uplink resource (to be sent to a single reception point). Also in the case when the specific information to be sent on one resource of the uplink channel is a complex information intended for both an orthogonal resource and a non-orthogonal resource, a third criterion may be used for choosing the uplink resource and determining the effective pathloss for it, as further disclosed herein.

According to one embodiment, in case of the orthogonal uplink resources (first criterion), an effective pathloss may be derived from results of pathloss measurements for multiple transmission/reception points using a predefined rule. For example, the effective pathloss for the uplink resource may be determined as a minimum value out of several values of the pathloss measured to the multiple transmission/reception points, or as an inverse of a sum of inverse values of the pathloss (PL) measured for each of the multiple reception points ($1/PL=1/PL_1+1/PL_2 \ldots +1/PL_N$).

In case of non-orthogonal uplink resource, the uplink channel (e.g., PUCCH or PUSCH) ID for that resource (or resource ID) may define which pathloss measurement to use and/or the single reception point. In other words, the effective pathloss to the single reception point may be determined as a function of (e.g., being equal or proportional to) a measured pathloss to the single transmission reception point associated with the ID of the non-orthogonal uplink channel (e.g., PUCCH or PUSCH) resource to be used for the UL transmission. Thus the UE may select a corresponding pathloss measurement based on the uplink channel ID (or resource ID) for the non-orthogonal resource (e.g., using for a cell specific or reception point specific setup).

It is noted that the ID of the uplink channel associated with each resource of the orthogonal and non-orthogonal uplink resources may be configured by the wireless network and provided to the UE. This ID of the uplink channel may be identical for the each resource, identical for selected resources or different for all or selected resources of the orthogonal and non-orthogonal uplink resources.

Moreover, according to another embodiment, the specific information to be transmitted on one uplink resource may be complex information intended for both an orthogonal resource and a non-orthogonal resource, then a third criterion may be used for determining the effective pathloss. The used uplink resource may be selected according to a predetermined set of rules (e.g., default rules) from the orthogonal resource and non-orthogonal resource. According to this third criterion, the effective pathloss may be determined using the criterion (either first or second) corresponding to the selected resource (either orthogonal or non-orthogonal, respectively), e.g., as being equal or proportional to the measured value of the pathloss to the single reception point when the non-orthogonal resource was selected.

For example, there may be PUCCH combinations to be sent on the same resource (e.g., CQI+ dynamic Ack/Nack) where one transmission (e.g., CQI) is originally is on the non-orthogonal PUCCH resource and another (dynamic Ack/Nack) is in the orthogonal PUCCH resource. A straightforward solution for this is that power control follows the setting of the channel that is actually used, which in this case would be the non-orthogonal resource with the affecting PUCCH pathloss being equal or proportional to the measured value of the pathloss as discussed above.

Alternatively, the third criterion may mean that the effective pathloss is determined by the second criterion, e.g., as being equal or proportional to the measured value of the pathloss to the single reception point associated with the non-orthogonal resource, irrespective of the type of selected resource.

Besides of the resource type which is configuration-specific and configured in a UE-specific manner (e.g., as part of semi-static CoMP configuration), also the Po parameter (see Equations 1 and 2) may be reception point-related/specific or uplink (e.g., PUCCH) resource specific (i.e., Po parameter may relate to certain Cell/RRH or CoMP specific PUCCH resources). Different types of reception points (macro, RRH, pico) may have different interference levels and then the target Rx level at the node may need to be different. The orthogonal PUCCH resources may be received jointly by multiple points and then a lower Tx power may be sufficient.

The cell specific part of Po may be used to define the power level of the signal at the reception point. Depending on the interference level, different values may be used in different cells/reception points (e.g., in order to have the same SINR for PUCCH in different cells) or on different channel resources or channel resource types. If the pathloss is selected according to intended reception point or used channel resource or channel resource type, then also Po may be the one that is used in the intended reception point or on the used channel resource or channel resource type.

Instead or in addition to the reception point (e.g., using CSI-RS-resource) or PUCCH resource or resource type specific Po, also closed loop commands may be PUCCH resource or resource type specific. This may be useful e.g., in the case the UE has both orthogonal and non-orthogonal PUCCH resources in use. Another case may be such where the PUCCH resource group (e.g., related to dynamic Ack/Nack) changes dynamically. Closed loop commands can also be used to compensate errors in pathloss estimation or even replace point specific pathloss measurements. However, as pointed out earlier, good open loop behaviour may be desirable, for example, for a scheduling request or when closed loop commands are used to compensate errors in the open loop and potentially adapt power to changes in interference levels.

It is noted that a PUCCH link adaptation relies on power control only. However, in the case of PUSCH, the quality difference between UCI (uplink control information) and user data (higher layer data carried by the logical uplink shared channel UL-SCH) is adjusted based on a higher-layer configured beta parameter in addition to the power control.

According to another embodiment of the invention, it is possible to define multiple beta parameters which may be used for the non-orthogonal uplink resource, e.g., in different scenarios as follows:

Beta1 corresponds to the scenario (Scenario A) in which both user data on UL-SCH and UCI are received based on a single-cell reception; and Beta2 corresponds to the scenario (Scenario B) in which PUSCH may benefit from a multi-cell reception whereas UCI is received based on the single-cell reception; and Beta3 corresponds to the scenario (Scenario C) in which both user data on UL-SCH and UCI are received based on a multi-cell reception.

In other words, the user equipment may receive by signaling from the wireless network a beta related parameter indicating which beta parameter (from Beta1, Beta2 and Beta3) to use in dimensioning of PUSCH resources for the uplink control information to be transmitted on the PUSCH.

This embodiment may be useful for UL CoMP reception limited with backhaul and/or eNB processing unit latency and capacity. In that case, the UE may be dynamically indicated to selected beta parameter corresponding to the intended UL CoMP reception scenario. Backhaul and/or CoMP detection can cause a latency that is not acceptable for the UCI although bearable for the UL-SCH data. Hence, the UCI can be continuously received using the single reception point, but the UL-SCH detection may jump back and forth between the single-point reception and the CoMP (multi-point) reception, depending on the scheduling of other UEs. Hence the quality ratio between the UCI and the UL-SCH data is not constant but dynamic, requiring also for the beta parameter to be dynamic. In other words, this embodiment may require that the UL scheduling grant contains indication of beta parameter corresponding to intended UL-SCH reception type (single-point or multi-point reception). According to another embodiment, Beta1 may be used both in Scenario A and Scenario C as the quality ratio between the UCI and the UL-SCH data may be rather constant between the scenario where both UCI and UL-SCH are received based on the single-cell reception and the scenario where both UCI and UL-SCH are received based on the multi-cell reception.

Figure 3:
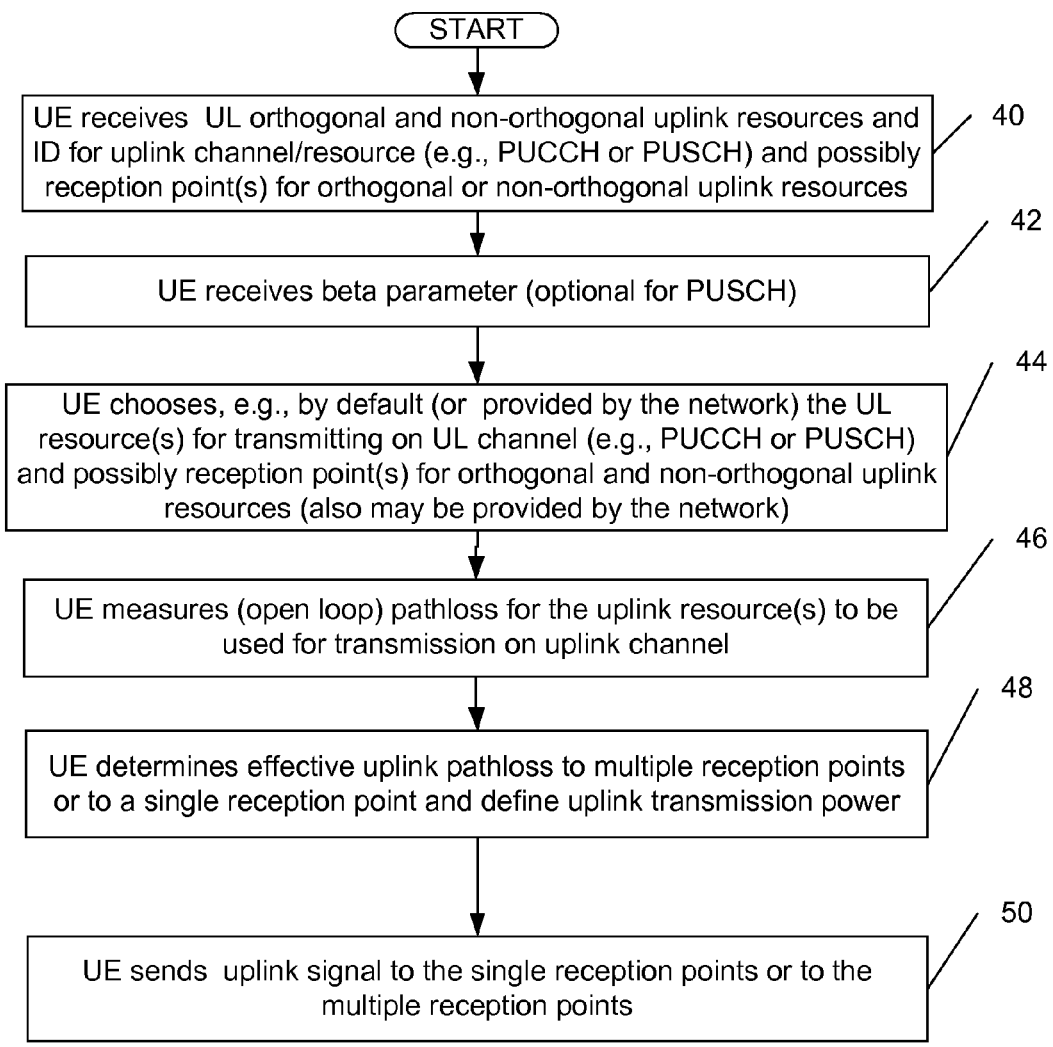
FIGS. 3-4 are a flow chart demonstrating implementation of exemplary embodiments of the invention performed by a user equipment.

FIG. 3 shows an exemplary flow chart demonstrating implementation of embodiments of the invention performed by the user equipment. It is noted that the order of steps shown in FIG. 3 is not absolutely required, so in principle, the various steps may be performed out of the illustrated order. Also certain steps may be skipped, different steps may be added or substituted, or selected steps or groups of steps may be performed in a separate application.

In a method according to this exemplary embodiment, as shown in FIG. 3, in a first step 40, a UE receives a configuration of orthogonal and non-orthogonal uplink resources, wherein the configuration comprises an indication of resource type (orthogonal or non-orthogonal) for each resource, and/or an indication of a criterion to be used in the determination of the effective pathloss (e.g., first or second criterion) by the wireless network, configuration of a set of downlink reference signal resources and possibly related downlink reference signal transmission powers, and an ID for an uplink channel/resource (e.g., PUCCH or PUSCH) as described herein, wherein this ID is associated with a certain downlink reference signal resource when the uplink channel/resource of the non-orthogonal type, or the ID is associated with a certain set of downlink reference signal resources when the uplink channel/resource is of the orthogonal type, and possibly reception point(s) for the orthogonal or non-orthogonal uplink resources to which to send specific information.

In a next step 42, the UE receives a configuration of multiple beta parameters and a beta parameter indicator (only for the PUSCH) for data and uplink control information to be transmitted on the PUSCH as explained herein, indicating whether to use a first or a third beta parameter (e.g., corresponding to a similar type of reception for both data and uplink control information) or a second beta parameter (e.g., corresponding to different types of reception for data and uplink control information). Step 42 and sub sequent procedure is discussed in reference to FIG. 4.

In a next step 44, the UE chooses, e.g., by default (or provided by the network, or by default rules based on the data type(s) to be transmitted) the UL resource(s) for transmitting on the UL channel (e.g., PUCCH or PUSCH) and possibly reception point(s) (also may be provided by the network) for orthogonal and non-orthogonal uplink resources, as explained herein. In a next step 46, the UE measures (e.g., using open loop method) pathloss from the configured set of downlink reference signal resources and possible related downlink reference signal transmission powers for the uplink resource(s) to be used for transmission on the uplink channel to the single reception points or to the multiple reception points.

In a next step 48, the UE determines an effective pathloss to the multiple reception points or to the single reception point and define the transmit power for the uplink transmission using the effective pathloss. In step 48, if the resource chosen in step 44 is orthogonal (or if the use of the first criterion is indicated), the effective pathloss is determined according to a first criterion as explained herein, and if the chosen resource is non-orthogonal (or if the use of the second criterion is indicated), the effective pathloss is determined according to a second criterion as explained herein. And in a next step 50, the UE sends the uplink signal to the single reception point or to the multiple reception points.

Figure 4:
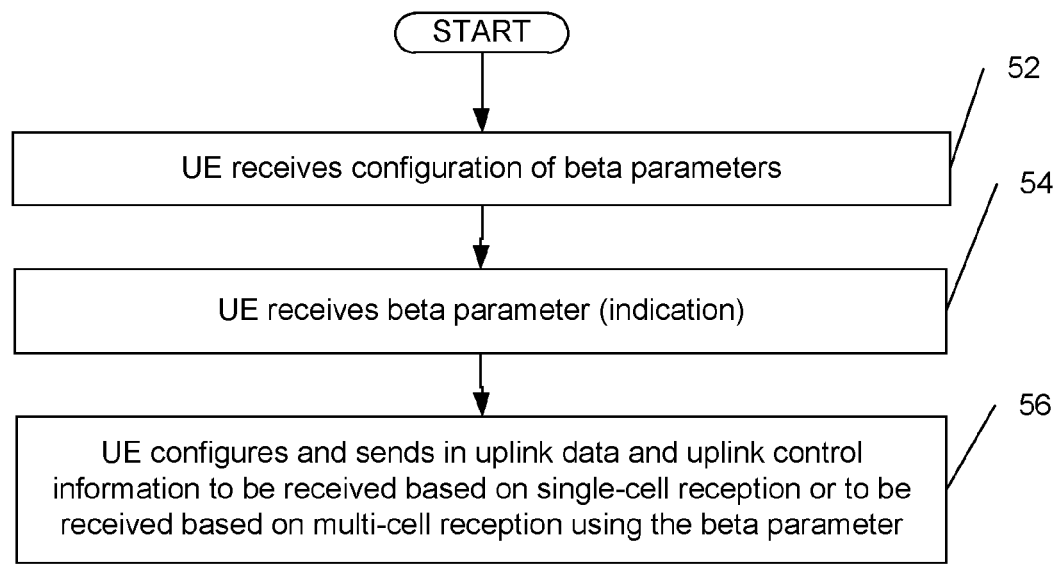

FIG. 4 shows another exemplary flow chart demonstrating implementation of embodiments of the invention performed by the user equipment. It is noted that the order of steps shown in FIG. 4 is not absolutely required, so in principle, the various steps may be performed out of the illustrated order. Also certain steps may be skipped, different steps may be added or substituted, or selected steps or groups of steps may be performed in a separate application.

In a method according to this exemplary embodiment, as shown in FIG. 4, in a first step 52, the UE receives a configuration of multiple beta parameters, e.g., a description of beta1, beta2 and beta3 as explained above.

In a next step 54, the UE receives a beta parameter indicator for data and uplink control information to be transmitted on the uplink, indicating whether to use the first or the third beta parameter (e.g. corresponding to a similar type of reception, single-cell or multi-cell reception, for both data and uplink control information) or the second beta parameter (e.g., corresponding to different types of reception, multi-cell reception for the data, and single-cell reception for the uplink control information).

In a next step 56, the UE configures and sends the uplink signal to be received based on single-cell reception or to be received based on multi-cell reception using the beta parameter.

Figure 5:
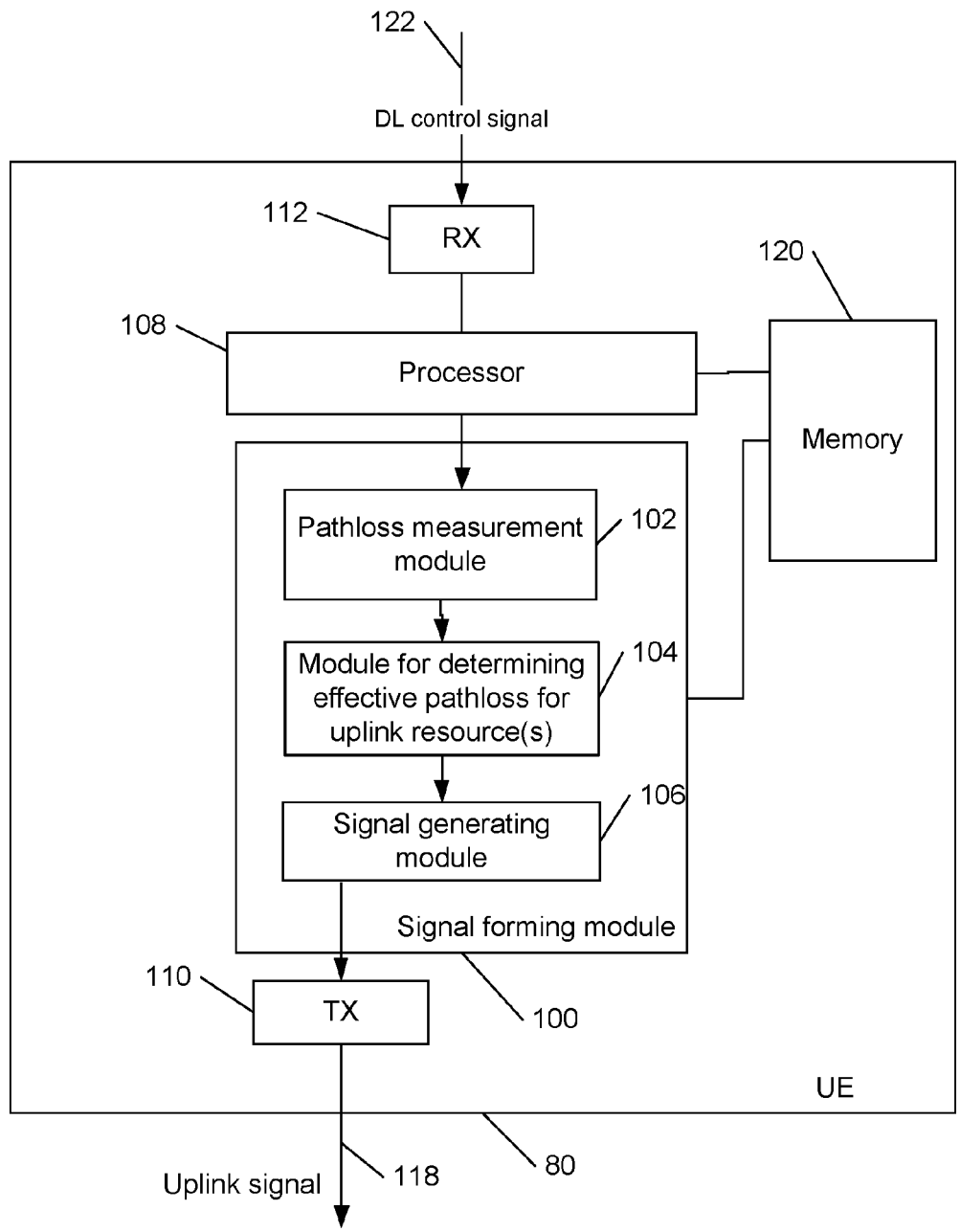
FIG. 5 is a block diagram of a user equipment for practicing exemplary embodiments of the invention.

FIG. 5 shows an example of a simplified block diagram of a LTE wireless device 80 (e.g., UE, eNB, etc.) for practicing exemplary embodiments of the invention. The UE may be a mobile phone, a camera phone, a video phone, a portable device, a computer, or some other wireless devices. The LTE wireless device 80 comprises a signal forming module 100, at least one processor 108, at least one memory 120, at least one transmitter 110 and at least one receiver 112 for transmitting and receiving corresponding wireless signals (transmitting and receiving antennas are not shown in FIG. 5).

The signal forming module 100 comprises a pathloss measurement module 102, a module for determining the effective pathloss for uplink resource(s) 104, and a signal generating module 106 for implementing exemplary embodiments of the invention demonstrated in FIGS. 3-4. For example, the pathloss measurement module 102 may be used for implementing steps 44-46 of FIG. 3, the module for determining the effective pathloss for uplink resource(s) 104 may be used for implementing step 48 of FIG. 3, the receiver 112 may be used for implementing steps 40-42 and 52-54 of FIGS. 3-4 (see DL control signal 122) and the signal generating module 106 and the transmitter 110 may be used for implementing step 50 and 56 of FIGS. 3-4 (see uplink signal 118).

The transmitter 110 and the receiver 112 may be generally means for transmitting/receiving and may be implemented as a transceiver, or a structural equivalence (equivalent structure) thereof.

Various embodiments of the at least one memory 120 (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 108 include but are not limited to general purpose computers, special purpose computers, microprocessors, digital signal processors (DSPs) and multi-core processors.

The signal forming module 100, or each of the modules 102, 104 and 106 may be implemented as an application computer program stored, e.g., in the at least one memory 120, but in general it may be implemented as a software, a firmware and/or a hardware module or a combination thereof. In particular, in the case of software or firmware, one embodiment may be implemented using a software related product such as a computer readable memory (e.g., a non-transitory computer readable memory), computer readable medium or a computer readable storage structure comprising computer readable instructions (e.g., program instructions) using a computer program code (i.e., the software or firmware) thereon to be executed by a computer processor.

Furthermore, the module 100, 102, 104 or 106 may be implemented as a separate block or may be combined with any other module/block of the module 100 or it may be split into several blocks according to their functionality. Moreover, it is noted that all or selected modules of the module 100 may be implemented using an integrated circuit (e.g., using an application specific integrated circuit, ASIC).

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

The invention claimed is:

1. A method comprising,
receiving, by a user equipment from a wireless network, information about which beta parameter out of a multiple of different beta parameters is to be used, the to-be-used beta parameter indicating an intended physical uplink shared channel reception type, the indicated reception type being one of the following: user data and uplink control information are received based on a single-cell reception, user data is received based on multi-cell reception and uplink control information is received based on the single-cell reception, and user data and uplink control information are received based on a multi-cell reception; and
transmitting by the user equipment the data and the uplink control information on a physical uplink shared channel based on the beta parameter.

2. The method of claim 1, wherein the multiple reception points are associated with a preconfigured coordinated multi-point setup and the single reception point is associated with a cell specific or reception point specific setup.

3. The method of claim 1, further comprising:
measuring by the user equipment a pathloss for an uplink resource out of orthogonal uplink resources and non-orthogonal uplink resources to a single reception point or to multiple reception points in a wireless network; and
determining by the user equipment an effective pathloss to define a transmit power to wirelessly transmit specific information to the single reception point or to the multiple reception points on the uplink resource, the measuring and determining are performed using:
a first criterion where, if the uplink resource is an orthogonal uplink resource, an effective pathloss to the multiple reception points is determined according to a predefined rule, and
a second criterion where, if the uplink resource is a non-orthogonal uplink resource, an effective pathloss to the single reception point is determined as being proportional to the pathloss measured to the single reception point using an identification of the non-orthogonal uplink resource.

4. The method of claim 3, wherein the specific information is intended to be sent on the orthogonal uplink resource to the multiple reception points, and the predefined rule is used for the determining the effective pathloss which defines the transmit power for the uplink resource.

5. The method of claim 3, wherein the specific information is intended to be sent on the non-orthogonal uplink resource and the effective pathloss defines the transmit power for the uplink resource.

6. The method of claim 3, wherein the specific information is a complex information intended for both an orthogonal resource and a non-orthogonal resource, and the uplink resource is chosen by default rules, so that if the chosen resource is orthogonal, the effective pathloss is determined according to the first criterion, and if the chosen resource is non-orthogonal, the effective pathloss is determined according to the second criterion.

7. The method of claim 3, wherein before the measuring the method comprises:
receiving by the user equipment from a wireless network a configuration of the orthogonal and non-orthogonal uplink resources with the identification of each resource of the orthogonal and non-orthogonal uplink resources.

8. The method of claim 7, wherein the identification is identical for the each resource, identical for selected resources or different for all or selected resources of the orthogonal and non-orthogonal uplink resources.

9. The method of claim 3, wherein choosing the uplink resource to be used for the wireless transmission by the user equipment of the specific information is performed by the wireless network or by the user equipment, or by both the wireless network and the user equipment.

10. The method of claim 3, wherein according to the predefined rule the effective pathloss for the uplink resource is determined as a minimum value out of values of the pathloss measured to the multiple reception points or as an inverse of a sum of inverse values of the pathloss measured to each of the multiple reception points.

11. The method of claim 3, wherein the user equipment receives from the wireless network a set of downlink resources which are used by the user equipment to measure the pathloss to the single reception point or to the multiple reception points.

12. The method of claim 11, wherein the downlink resources are downlink channel state information reference signals.

13. The method of claim 3, wherein the measuring by the user equipment the pathloss to the single reception point or to the multiple reception points is provided using open loop measurements based on downlink resources provided by the wireless network for the user equipment.

14. The method of claim 3, wherein according to the second criterion, the effective pathloss to the single reception point is equal to the measured pathloss to the single reception point.

15. The method of claim 3, wherein the transmit power is further dependent on a parameter defining single power level which is reception-point specific or uplink-resource specific.

16. The method of claim 3, wherein the transmit power further depends on closed loop commands or accumulated value of closed loop commands which is uplink-resource specific or uplink-resource-type specific.

17. The method of claim 3, wherein the single reception point is selected using the effective pathloss determined based on the identification of the non-orthogonal uplink resource.

18. An apparatus, comprising:
- at least one processor and a memory storing a set of computer instructions, in which the processor and the memory storing the computer instructions are configured to cause the apparatus to:
- receive from a wireless network information about which beta parameter out of a multiple of different beta parameters is to be used, the to-be-used beta parameter indicating an intended physical uplink shared channel reception type, the indicated reception type being one of the following: user data and uplink control information are received based on a single-cell reception, user data is received based on multi-cell reception and uplink control information is received based on the single-cell reception, and user data and uplink control information are received based on a multi-cell reception; and
- transmit the data and the uplink control information on a physical uplink shared channel based on the beta parameter.

\* \* \* \* \*